US008971465B2

(12) United States Patent
Varanese et al.

(10) Patent No.: US 8,971,465 B2
(45) Date of Patent: Mar. 3, 2015

(54) RECEIVER-SIDE ESTIMATION OF AND COMPENSATION FOR SIGNAL IMPAIRMENTS

(71) Applicant: QUALCOMM Incorporated, San Diego, CA (US)

(72) Inventors: Nicola Varanese, Nuremberg (DE); Christian Pietsch, Nuremberg (DE); Juan Montojo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/762,206

(22) Filed: Feb. 7, 2013

(65) Prior Publication Data

US 2013/0259173 A1  Oct. 3, 2013

Related U.S. Application Data

(60) Provisional application No. 61/618,624, filed on Mar. 30, 2012, provisional application No. 61/719,326, filed on Oct. 26, 2012.

(51) Int. Cl.
*H03D 1/04* (2006.01)
*H04L 25/02* (2006.01)
*H04L 1/00* (2006.01)
*H04L 27/26* (2006.01)
(Continued)

(52) U.S. Cl.
CPC ............ *H04L 25/022* (2013.01); *H04L 1/0001* (2013.01); *H04L 25/0232* (2013.01); *H04L 27/2613* (2013.01); *H04L 27/2647* (2013.01); *H04L 27/3854* (2013.01); *H04L 27/3863* (2013.01); *H04L 27/3872* (2013.01); *H04L 2027/003* (2013.01); *H04L 2027/0073* (2013.01); *H04L 2027/0089* (2013.01); *H04L 2027/0093* (2013.01); *H04L 2027/0095* (2013.01)
USPC ........... 375/346; 375/295; 375/261; 455/323; 455/130; 455/91

(58) Field of Classification Search
USPC .................................................. 375/346, 316
See application file for complete search history.

(56) References Cited

U.S. PATENT DOCUMENTS

| 6,535,715 | B2 | 3/2003 | Dapper et al. |
| 6,553,040 | B2 | 4/2003 | Bernath et al. |

(Continued)

FOREIGN PATENT DOCUMENTS

| EP | 1793548 A1 | 6/2007 |
| EP | 2259517 A2 | 12/2010 |

(Continued)

OTHER PUBLICATIONS

Garavaglia, et al., "OFDMA PHY for EPoC: a Baseline Proposal," IEEE 802.3bn, Geneva, Switzerland, Sep. 27-28, 2012, 30 pages.

(Continued)

*Primary Examiner* — Eva Puente
(74) *Attorney, Agent, or Firm* — Mahamedi Paradice LLP

(57) ABSTRACT

A receiver receives a repeating or periodic signal and, based on the signal, estimates a carrier frequency offset for the receiver. Based on the signal and the estimated carrier offset, an I/Q mismatch for the receiver is estimated and compensation for the estimated I/Q mismatch is performed. After compensating for the estimated receiver I/Q mismatch, the carrier frequency offset is re-estimated.

20 Claims, 9 Drawing Sheets

(51) Int. Cl.
  *H04L 27/38* (2006.01)
  *H04L 27/00* (2006.01)

(56) References Cited

U.S. PATENT DOCUMENTS

| | | | |
|---|---|---|---|
| 6,697,374 | B1 | 2/2004 | Marmur et al. |
| 7,224,666 | B2 | 5/2007 | Gummadi et al. |
| 7,313,203 | B2 | 12/2007 | Tubbax et al. |
| 7,443,783 | B2 | 10/2008 | DeChamps et al. |
| 7,466,768 | B2 | 12/2008 | Su et al. |
| 7,626,921 | B2 | 12/2009 | Egashira et al. |
| 7,844,004 | B2 | 11/2010 | De Rore |
| 7,885,360 | B2 | 2/2011 | Tanabe et al. |
| 7,899,140 | B2 | 3/2011 | Yousef |
| 7,957,476 | B2 | 6/2011 | Sanada et al. |
| 7,961,696 | B2 | 6/2011 | Ma et al. |
| 8,081,690 | B2 | 12/2011 | Ma et al. |
| 8,194,529 | B2 | 6/2012 | Stadelmeier et al. |
| 8,265,181 | B2 | 9/2012 | Luong et al. |
| 8,279,958 | B2 | 10/2012 | Okehie et al. |
| 8,290,083 | B2 | 10/2012 | Chrabieh |
| 2003/0072254 | A1 | 4/2003 | Ma et al. |
| 2005/0107059 | A1 | 5/2005 | Lehning et al. |
| 2007/0025460 | A1 | 2/2007 | Budianu et al. |
| 2007/0183482 | A1 | 8/2007 | Fujita et al. |
| 2008/0063098 | A1 | 3/2008 | Lai et al. |
| 2008/0165891 | A1 | 7/2008 | Budianu et al. |
| 2008/0267320 | A1 | 10/2008 | Dateki |
| 2008/0298227 | A1 | 12/2008 | Jonsson |
| 2008/0310534 | A1 | 12/2008 | Egashira et al. |
| 2009/0116581 | A1 | 5/2009 | Liau |
| 2009/0247172 | A1 | 10/2009 | Palanki et al. |
| 2009/0257520 | A1 | 10/2009 | Lin et al. |
| 2010/0136919 | A1 | 6/2010 | Sathananthan et al. |
| 2010/0195518 | A1 | 8/2010 | Mccloud et al. |
| 2010/0197241 | A1 | 8/2010 | Aedudodla et al. |
| 2010/0208783 | A1* | 8/2010 | Lin et al. ............... 375/224 |
| 2011/0135036 | A1* | 6/2011 | Andgart et al. ........... 375/316 |
| 2011/0194656 | A1 | 8/2011 | Shaked et al. |
| 2011/0317785 | A1 | 12/2011 | Petrov et al. |
| 2012/0033751 | A1 | 2/2012 | Sathananthan et al. |
| 2012/0134440 | A1 | 5/2012 | Yun et al. |
| 2012/0147761 | A1 | 6/2012 | Zhang et al. |
| 2012/0207257 | A1 | 8/2012 | Park et al. |
| 2012/0275784 | A1 | 11/2012 | Soto et al. |
| 2013/0121392 | A1 | 5/2013 | Thompson et al. |
| 2013/0188757 | A1 | 7/2013 | Kalyani et al. |
| 2013/0259153 | A1 | 10/2013 | Varanese et al. |
| 2014/0010268 | A1 | 1/2014 | Yu et al. |
| 2014/0177741 | A1 | 6/2014 | Liu et al. |
| 2014/0198865 | A1 | 7/2014 | Pietsch et al. |
| 2014/0211833 | A1 | 7/2014 | Schoeneich et al. |
| 2014/0255029 | A1 | 9/2014 | Varanese et al. |

FOREIGN PATENT DOCUMENTS

| | | |
|---|---|---|
| GB | 2489035 A | 9/2012 |
| JP | 2004159084 A | 6/2004 |
| WO | WO-02097476 A2 | 12/2002 |
| WO | 2008112587 | 9/2008 |

OTHER PUBLICATIONS

Luise Marco et al., "Carrier Frequency Recovery in All-Digital Modems for Burst-Mode Transmissions", IEEE Transactions on Communications, vol. 43, No. 2/3/4, Feb./Mar./Apr. 1999, p. 1169-1178.

Van De Beek, "ML Estimation of Time and Frequency Offset in OFDM Systems," IEEE Transactions on Signal Processing, 1997, 45 (7), p. 1800-1805.

International Search Report and Written Opinion—PCT/US2013/033360—ISA/EPO—Jul. 1, 2013.

Mamiko Inamori et al: "IQ Imbalance Estimation Scheme in the Presence of DC Offset and Frequency Offset in the Frequency Domain", IEICE Transactions on Fundamentals of Electronics, Communications and Computer Sciences, Engineering Sciences Society, Tokyo, JP, vol. E92A, No. 11, Nov. 1, 2009, pp. 2688-2696, XP001550868,ISSN: 0916-8508, DOI: 10.1587/TRANSFUN.E92. A.2688.

Boyd, Ed, "EPOC Upstream Mapping", IEEE 802.3bn EPoC proceedings, San Antonio, TX, Nov. 2012, 27 pages.

Boyd, Ed, "EPOC Upstream Mapping, Part 2", IEEE 802.3bn EPoC proceedings, Feb. 2013, 16 pages.

Kliger A., et al., "Baseline Proposal for EPoC PHY Layer; kliger_01_0912", IEEE Draft; KLIGER_01_0912, IEEE-SA, Piscataway, NJ USA, vol. 802.3bn, Sep. 22, 2012, pp. 1-26, XP068020499, [retrieved on Sep. 22, 2012], pp. 5-9, pp. 23, 24.

Kliger A., et al., "Baseline Proposal for EPoC PHY Layer; kliger_01a_0912", IEEE Draft; KLIGER_01A_0912, IEEE-SA, Piscataway, NJ USA, vol. 802.3bn, Sep. 22, 2012, pp. 1-23, XP068020524, [retrieved on Sep. 22, 2012], pp. 3, 4, 10.

Kliger A., et al., "OFDM Numerology for EPoC; kliger_01_0113", IEEE Draft; KLIGER_01_0113, IEEE-SA, Piscataway, NJ, USA, vol. 802.3bn, Jan. 29, 2013, pp. 1-20, XP068047297, [retrieved on Jan. 29, 2013], pp. 16-19.

Montreuil L., "EPoC Modulation Orders EPoC Modulation Orders; Montreuil_01_0512", IEEE Draft; MONTREUIL-01_0512, IEEE-SA, Piscataway, NJ, USA, vol. 802.3.epoc, Aug. 11, 2012, pp. 1-18, XP017752080, [retrieved on Aug. 11, 2012], pp. 6-17.

Bhatt T et al., "Initial Synchronization for 802.16e Downlink," Fortieth Asilomar Conference on Signals, Systems and Computers, 2006. ACSSC '06. pp. 701-706, (Oct. 1, 2006) (Oct. 1, 2006); ACSSC.2006.354839; XP031081135, ISBN: 978-1-4244-0784-2.

Fertl P. et al., "channel estimation in wireless OFDM systems with irregular pilot distribution," ieee transactions on signal processing, vol. 58, No. 6, Jun. 2010.

Khedr M. et al., "channel estimation for wimax systems using fuzzy logic cognitive radio," wireless and optical communications networks, 2009. wocn '09. IFIP international conference on, vol., no., pp. 1,6, Apr. 28-30, 2009.

Shen Y. et al., "on uplink channel estimation in wimax systems" international journal of mobile computing and multimedia communications, 2(2), 67-77, Apr.-Jun. 2010.

* cited by examiner

RECEIVER-SIDE ESTIMATION OF AND COMPENSATION FOR SIGNAL IMPAIRMENTS

RELATED APPLICATIONS

This application claims priority to U.S. Provisional Patent Applications No. 61/618,624, titled "Receiver-Side Estimation of and Compensation for Signal Impairments," filed Mar. 30, 2012, and No. 61/719,326, titled "Receiver-Side Estimation of and Compensation for Signal Impairments," filed Oct. 26, 2012, both of which are hereby incorporated by reference in their entirety.

TECHNICAL FIELD

The present embodiments relate generally to communication systems, and specifically to compensating for signal impairments including I/Q mismatch and carrier frequency offset in transceivers performing direct down-conversion to baseband (e.g., direct-conversion or zero-IF architectures).

BACKGROUND OF RELATED ART

Transceivers are sensitive to various signal impairments that affect the quality of the transmitted and received signals. Signal impairments may result from non-idealities in the RF front-ends of the transceivers. For example, mismatched active and passive elements (e.g., quadrature mixers, filters, digital-to-analog converters, and/or analog-to-digital converters) in the I and Q (in-phase and quadrature) signal paths introduce I/Q mismatch impairments in transmitted and received signals. I/Q mismatch, which also may be referred to as I/Q offset, is present in both the transmitter and receiver. In another example, carrier frequency offset in the receiver impairs received signals. Channel effects may also impair signals.

I/Q mismatch introduces an image signal that degrades signal quality. The signal-to-image ratio is typically around 25-30 dB, making I/Q mismatch an issue for systems targeting high spectral efficiency. I/Q mismatch is also frequency dependent, making I/Q mismatch an issue for wideband communication systems.

Accordingly, there is a need for techniques to estimate and compensate for signal impairments.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

Techniques are disclosed for compensating in a receiver for signal impairments introduced in the transmitter and receiver. In some embodiments, the techniques include estimating the signal impairments and compensating for the estimated impairments.

In some embodiments, a method of operating a receiver (e.g., a direct-conversion receiver) includes receiving a repeating or periodic signal and, based on the signal, estimating a carrier frequency offset for the receiver. An I/Q mismatch for the receiver is estimated based on the signal and the estimated carrier frequency offset. The receiver compensates for the estimated I/Q mismatch and, after compensating for the estimated I/Q mismatch, re-estimates the carrier frequency offset.

In some embodiments, a communication device includes a receiver to receive signals including a repeating or periodic signal. The communication device also includes one or more processors and memory storing one or more programs to be executed by the one or more processors. The one or more programs include instructions to perform two or more iterations of estimating a carrier frequency offset for the receiver, based on the signal; estimating an I/Q mismatch for the receiver, based on the signal and the estimated carrier frequency offset; and compensating for the estimated I/Q mismatch for the receiver.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 1A:
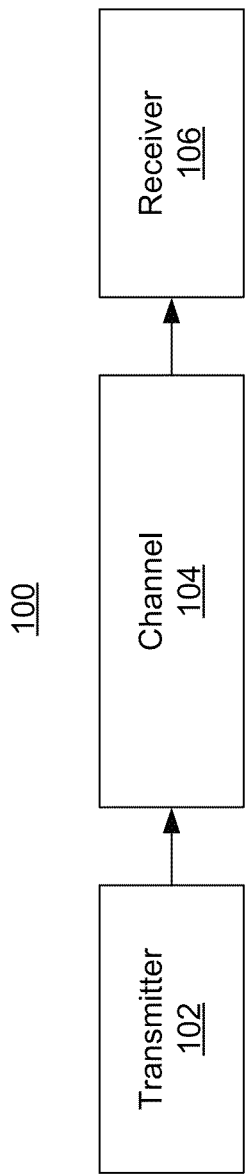
FIG. 1A illustrates a communications system in accordance with some embodiments.

FIG. 1A illustrates a communications system 100 in accordance with some embodiments. A transmitter 102 transmits a signal onto a channel 104, and a direct-conversion receiver 106 receives the signal from the channel 104. In some embodiments, the channel 104 is wireless. In other embodiments, the channel 104 is a wired link (e.g., a coaxial cable or other physical connection).

Figure 1B:
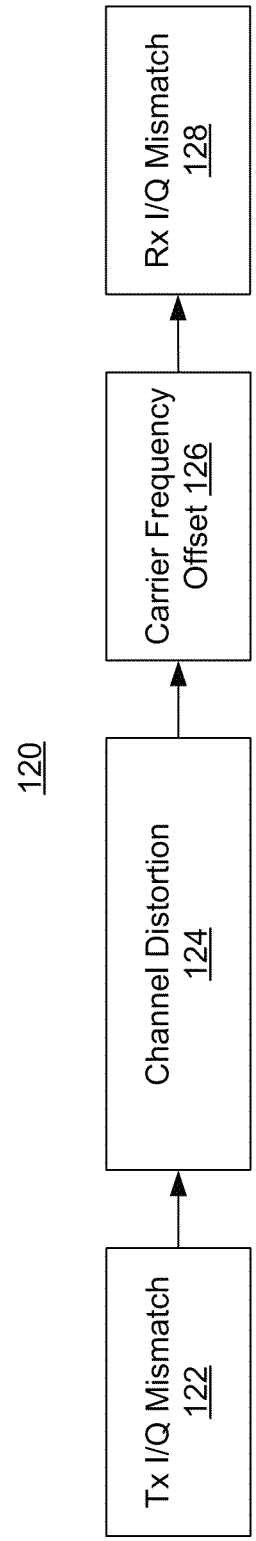
FIG. 1B illustrates sources of signal impairment in the communications system of FIG. 1A.

FIG. 1B illustrates sources of signal impairment, and thus signal degradation, in the communications system 100 of FIG. 1A. I/Q mismatch 122 in the transmitter 102 causes signal impairment, as does I/Q mismatch 128 in the receiver 106. The channel 104 introduces channel distortion 124, which may be linear distortion. Carrier frequency offset 126 in the receiver 106, which results from the frequency of a local oscillator in the receiver 106 differing from the frequency of a corresponding local oscillator in the transmitter 102, also causes signal impairment. In some embodiments, channel distortion 124 includes multi-path effects and Additive White Gaussian Noise (AWGN).

Figure 2A:
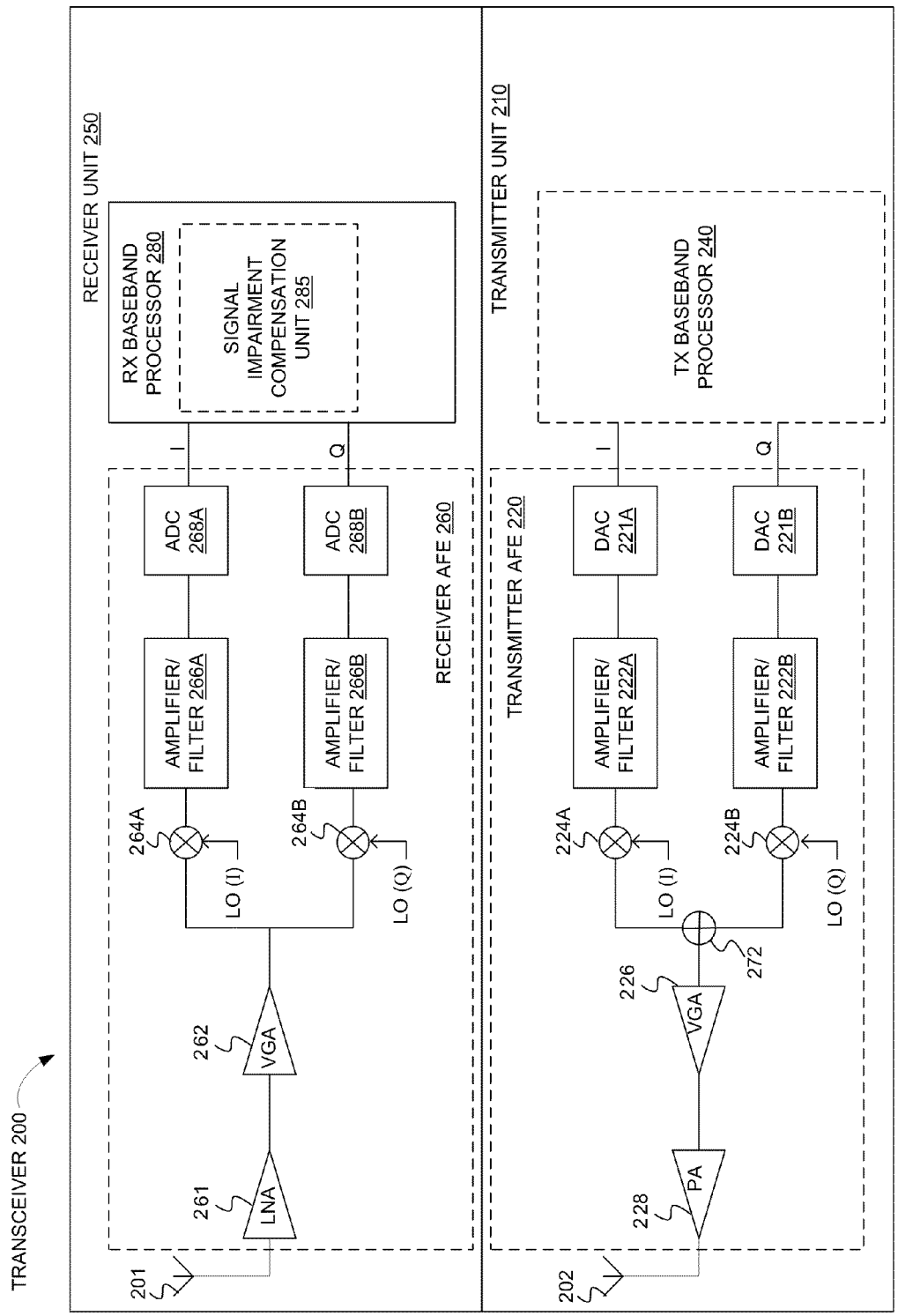
FIG. 2A is a block diagram of a direct-conversion transceiver in accordance with some embodiments.

FIG. 2A is a block diagram of a direct-conversion transceiver 200 using quadrature amplitude modulation (QAM) in accordance with some embodiments. The transceiver 200 may be included within a communication device (e.g., communication device 500, FIG. 5), such as a wireless (e.g., WLAN) device or a device with a wired network connection. As illustrated, the transceiver 200 includes a transmitter unit 210 and a receiver unit 250. The transmitter unit 210 of a first transceiver 200 corresponds to the transmitter 102 (FIG. 1A) and the receiver unit 250 of a second transceiver 200 corresponds to the receiver 106 (FIG. 1A).

In some embodiments, the transmitter unit 210 includes an antenna 202, a transmitter analog front end (AFE) 220, and a transmitter baseband processor 240. The receiver unit 250 includes an antenna 201, a receiver AFE 260, and a receiver baseband processor 280. In some embodiments, the receiver baseband processor 280 includes a signal impairment compensation unit 285 for estimating and compensating for signal impairments introduced both in the transmitter (e.g., transmitter 102, FIG. 1A) and receiver (e.g., receiver 106, FIG. 1A).

In the example of FIG. 2A, the transmitter AFE 220 includes a digital-to-analog converter (DAC) 221A for the I signal path, amplifier/filter circuitry 222A for the I signal path, a local oscillator (LO) mixer 224A for the I signal path, a DAC 221B for the Q signal path, amplifier/filter circuitry 222B for the Q signal path, an LO mixer 224B for the Q signal path, a combiner 272, a variable gain amplifier (VGA) 226, and a power amplifier (PA) 228. The mixers 224A and 224B up-convert the I and Q signals from baseband directly to the carrier frequency by mixing the I and Q signals with local oscillator signals LO(I) and LO(Q), where the frequency of the local oscillator signal is the carrier frequency. Mismatch between mixers 224A and 224B, between amplifiers/filters 222A and 222B, and/or between DACs 221A and 221B results in transmitter-side I/Q mismatch. The combiner 272 combines the up-converted I and Q signals.

The receiver AFE 260 includes a low-noise amplifier (LNA) 261, a VGA 262, an LO mixer 264A for the I signal path, amplifier/filter circuitry 266A for the I signal path, an analog-to-digital converter (ADC) 268A for the I signal path, an LO mixer 264B for the Q signal path, amplifier/filter circuitry 266B for the Q signal path, and an ADC 268B for the Q signal path. The mixers 264A and 264B directly down-convert the received signal into baseband I and Q signals by mixing the received signal with local oscillator signals LO(I) and LO(Q), where the frequency of the local oscillator signals (as generated by a local oscillator, not shown) is ideally the carrier frequency. Mismatch between mixers 264A and 264B, between amplifiers/filters 266A and 266B, and/or between ADCs 268A and 268B results in receiver-side I/Q mismatch.

A difference between the frequency of the local oscillator signals in the receiver unit 250 of a receiver 106 (FIG. 1A) and the corresponding frequency of local oscillator signals in the transmitter unit 210 of a transmitter 102 (FIG. 1A) results in carrier frequency offset.

The components described with reference to FIG. 2A are exemplary only. In various embodiments, one or more of the components described may be omitted, combined, or modified, and additional components may be included. For instance, in some embodiments, the transmitter unit 210 and receiver unit 250 may share a common antenna, or may have various additional antennas and transmitter/receiver chains. In other embodiments, there may be no antenna; instead, the transmitter unit 210 and receiver unit 250 connect to a wired link. In some implementations, the transceiver 200 may include less or more filter and/or amplifier circuitry (e.g., blocks 222 and 266 of FIG. 2A).

Figure 2B:
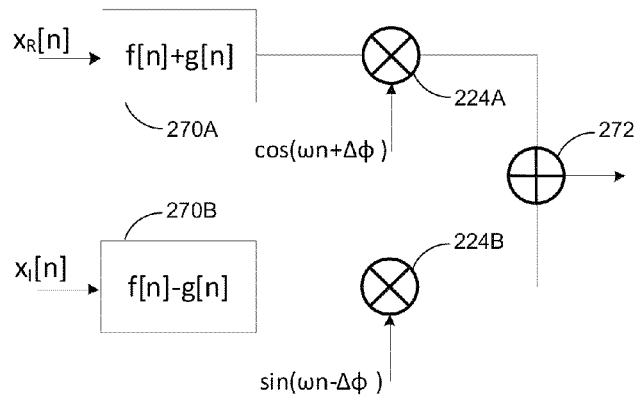
FIGS. 2B-2E are block diagrams illustrating signal impairments in accordance with some embodiments.

Attention is now directed to mathematical modeling of I/Q mismatch. FIG. 2B illustrates I/Q mismatch in a transmitter front end (e.g., transmitter AFE 220, FIG. 2A) in accordance with some embodiments. A signal component $x_R[n]$ is provided to the I signal path, which includes components 270A (e.g., DAC 221A and amplifier/filter 222A, FIG. 2A) and a mixer 224A. A signal $x_I[n]$ is provided to the Q signal path, which includes components 270B (e.g., DAC 221B and amplifier/filter 222B, FIG. 2A) and a mixer 224B. (The R and I subscripts refer to real and imaginary components, and thus respectively to the I and Q components, of a signal $x[n]$.) The signal path components 270A and 270B have corresponding functions $f[n]+g[n]$ and $f[n]-g[n]$, respectively, where $f[n]$ is common between the components 270A and 270B and $g[n]$ includes an amplitude mismatch (e.g., a frequency-dependent amplitude mismatch) between components 270A and 270B. A phase mismatch $\Delta\phi$ is introduced during up-conversion by mixers 224A and 224B. The I/Q mismatch of FIG. 2B thus is represented by $g[n]$ and $\Delta\phi$. The combiner 272 combines the up-converted I and Q signal to generate an RF transmitted signal.

The baseband equivalent of the RF transmitted signal, as affected by the I/Q mismatch of FIG. 2B, is $$r[n]=[\cos \Delta\phi(f[n]+g[n])*x_R[n] \sin \Delta\phi(f[n]-g[n])* x_I[n]]+j[-\sin \Delta\phi(f[n]+g[n])*x_R[n]+\cos \Delta\phi(f[n]-g[n])*x_I[n]]$$

With some change in notation, this expression may be written in matrix form as $$\begin{bmatrix} r_R[n] \\ r_I[n] \end{bmatrix} = \begin{bmatrix} \cos\Delta\phi(f[n]+g[n]) & -\sin\Delta\phi(f[n]-g[n]) \\ -\sin\Delta\phi(f[n]+g[n]) & \cos\Delta\phi(f[n]-g[n]) \end{bmatrix} * \begin{bmatrix} x_R[n] \\ x_I[n] \end{bmatrix}$$

Expanding the matrix results in $$\begin{bmatrix} r_R[n] \\ r_I[n] \end{bmatrix} = \begin{bmatrix} f[n]\cos\Delta\phi & g[n]\sin\Delta\phi \\ -g[n]\sin\Delta\phi & f[n]\cos\Delta\phi \end{bmatrix} * \begin{bmatrix} x_R[n] \\ x_I[n] \end{bmatrix} + \begin{bmatrix} g[n]\cos\Delta\phi & f[n]\sin\Delta\phi \\ -f[n]\sin\Delta\phi & g[n]\cos\Delta\phi \end{bmatrix} * \begin{bmatrix} x_R[n] \\ -x_I[n] \end{bmatrix}$$

This equation corresponds to the following relation in complex notation:

$$r[n]=(f[n] \cos \Delta\phi-jg[n] \sin \Delta\phi)*x[n]+(g[n] \cos \Delta\phi-jf[n] \sin \Delta\phi)*x^*[n]$$

If we define $$a[n] = f[n] \cos \Delta\phi - jg[n] \sin \Delta\phi$$

$$b[n] = g[n] \cos \Delta\phi - jf[n] \sin \Delta\phi$$

then we can write compactly $$r[n] = a[n] * x[n] + b[n] * x^*[n]$$

As this result indicates, I/Q mismatch causes interference between I and Q components in the time domain. Equivalently, I/Q mismatch causes interference between mirror frequencies in the frequency domain, as shown by transforming the equation for r[n] into the frequency domain:

$$R(f) = A(f)X(f) + B(f)X^*(-f)$$

I/Q mismatch can be perfectly compensated in the frequency domain via the following linear combination of the signal R(f) and its conjugate:

$$Y(f) = A^*(-f)R(f) - B(f)R^*(-f)$$
$$= [A^*(-f)A(f) - B^*(-f)B(f)]X(f)$$

where $\tilde{H}(f) = A^*(-f)A(f) - B^*(-f)B(f)$ is the equivalent transmitter shaping filter, which acts as a scaling factor to be corrected for. Dividing Y(f) by $\tilde{H}(f)$ recovers the original signal X(f).

This expression for the compensated signal Y(f) can be simplified by expressing complex signals in terms of their real and imaginary parts. Also, it is possible to define an alternative correction formula, $$Y(f) = R(f) - \frac{B(f)}{A^*(-f)} R^*(-f)$$
$$= A(f)\left(1 - \frac{B(f)B^*(-f)}{A(f)A^*(-f)}\right)X(f)$$

Note that the equivalent shaping filter is different in this case.

If the I/Q mismatch is small, we can approximate $f[n] \approx 1$, $\sin \Delta\phi \approx \Delta\phi$, $\cos \Delta\phi \approx 1$, $g[n] \sin \Delta\phi \approx 0$, so that the complex envelope of the transmitted signal reads $$r[n] = x[n] + b[n] * x^*[n],$$

where $b[n] = g[n] - j\Delta\phi$. Also, the interference due to I/Q mismatch can be subtracted directly as $y[n] = r[n] - b[n] * x^*[n]$.

The above mathematics model I/Q mismatch in the transmitter (e.g., transmitter 102, FIG. 1A). Receiver-side I/Q mismatch (e.g., in the receiver 106, FIG. 1A) may be modeled in the same fashion.

Assuming the only sources of distortion in the communication system are transmitter (Tx) I/Q mismatch, receiver (Rx) I/Q mismatch, and multi-path effects in the channel, the received signal in the frequency domain is $$Z(f) = \tilde{A}(f)X(f) + \tilde{B}(f)X^*(-f) + A_{Rx}(f)W(f) + B_{Rx}(f)W^*(-f)$$

where $$\tilde{A}(f) = A_{Rx}(f)H(f)A_{Tx}(f) + B_{Rx}(f)H^*(-f)B^*_{Tx}(-f)$$

$$\tilde{B}(f) = A_{Rx}(f)H(f)B_{Tx}(f) + B_{Rx}(f)H^*(-f)A^*_{Tx}(-f)$$

W(f) is the spectrum of the additive Gaussian noise and H(f) is the frequency response of the channel. (H(f) is thus unrelated to $\tilde{H}(f)$). The corrected signal $\hat{Z}(f)$ is defined as $$\hat{Z}(f) = X(f) - \frac{\tilde{B}(f)}{\tilde{A}^*(-f)} X^*(-f)$$

After straightforward calculations, it can be shown that the corrected signal reads $$\hat{Z}(f) = \tilde{A}(f)\left(1 - \frac{\tilde{B}(f)\tilde{B}^*(-f)}{\tilde{A}(f)\tilde{A}^*(-f)}\right)X(f) - \tilde{W}(f)$$

where $\tilde{W}(f)$ is the equivalent noise after the correction filter has been applied.

In some embodiments, transmitted signals are narrowband signals. For narrowband signals, the filters in the I and Q signal paths (e.g., filters 222A-B and 266A-B, FIG. 2A) function as scalar multipliers. For example, functions a[n] and b[n] reduce to scalars a and b. Also, signal impairments due to multi-path effects in the channel may be neglected in narrowband embodiments.

Figure 2C:
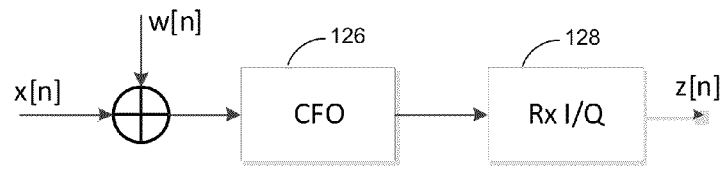

FIG. 2C illustrates signal impairments in a system (e.g., system 100, FIG. 1A) in which the received signal is affected by AWGN, carrier frequency offset 126, and receiver-side I/Q mismatch 128. Noise w[n] is mixed into the signal x[n] in the channel.

The received sampled signal z[n] can be expressed as $$z[n] = a e^{j\Delta\omega n} x[n] + b e^{-j\Delta\omega n} x^*[n] + aw[n] + bw^*[n]$$

where $\Delta\omega$ is the carrier frequency offset (CFO) 126. The I/Q mismatch 128 creates two different components rotating in opposite direction.

There are algorithms for CFO estimation based on the autocorrelation of the received signal, $r_{zz}[M] = z[n+M]z^*[n]$. The autocorrelation at lag M for the received signal affected by I/Q mismatch 128 is $$r_{zz}[M] = |a|^2 |x[n]|^2 e^{j\Delta\omega M} + |b|^2 |x[n]|^2 e^{-j\Delta\omega M} + ab^* e^{j2\Delta\omega(n+M)}(x[n])^2 + a^*b e^{-j2\Delta\omega(n+M)}(x^*[n])^2$$

The second term significantly degrades the accuracy of CFO estimation based on autocorrelation of the received signal.

However, the CFO 126 may be estimated using other estimation techniques. For example, the CFO 126 may be estimated using classical non-linear least squares (NLS) techniques in receivers that process multiple symbols at a time (e.g., when the system employs a repeating training sequence or a cyclic prefix of an OFDM symbol, which repeats twice and changes from OFDM symbol to OFDM symbol).

Once $\Delta\omega$ is known (or estimated), the (scalar) I/Q mismatch parameters a, b may be estimated. Defining $\tilde{x}[n] = e^{j\Delta\omega n}x[n]$, we can write the following matrix equation:

$$\begin{bmatrix} z[n] \\ z[n+1] \end{bmatrix} = \begin{bmatrix} \tilde{x}[n] & \tilde{x}^*[n] \\ \tilde{x}[n+1] & \tilde{x}^*[n+1] \end{bmatrix} \begin{bmatrix} a \\ b \end{bmatrix} + \begin{bmatrix} \tilde{w}[n] \\ \tilde{w}[n+1] \end{bmatrix}$$

The I/Q imbalance parameters can then be estimated by inverting the 2×2 system matrix in this equation.

The accuracy of the estimate of the I/Q mismatch parameters can be improved by stacking samples received over a whole period of M samples. Defining the input signal vector $\tilde{x}[n] = [\tilde{x}[n] \ \tilde{x}[n+1] \ \ldots \ \tilde{x}[n+M-1]]$ and the received signal vector $z[n] = [z[n] \ z[n+1] \ \ldots \ z[n+M-1]]$, received signal vector may be rewritten as $$z[n] = [\tilde{x}[n] \; \tilde{x}^*[n]] \begin{bmatrix} a \\ b \end{bmatrix} + \tilde{w}[n]$$

Solving for a, b now entails the inversion of an M×2 matrix. However, because of the linearity of the problem, classical low-complexity adaptive filtering techniques, such as least mean squares (LMS), may be used.

Once the I/Q mismatch parameters a, b have been found, the I/Q mismatch 128 can then be corrected by a linear combination of z[n] and z*[n], $$\hat{z}[n] = a^* z[n] - b z^*[n]$$
$$= e^{j\Delta\omega n}(|a|^2 - |b|^2)x[n] + w[n]$$

As this equation indicates, the CFO 126 can now be corrected using phase rotation.

Figure 3A:
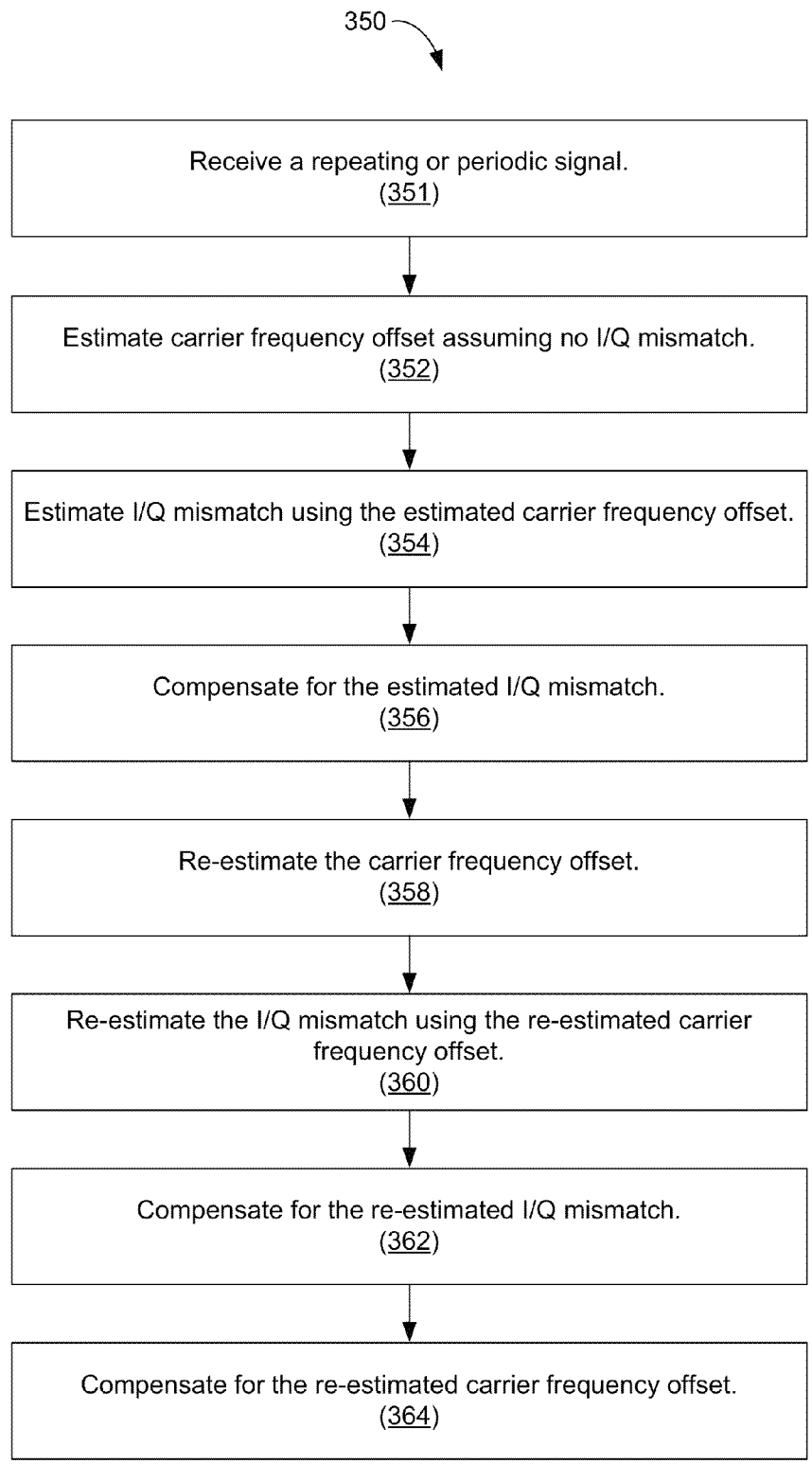
FIG. 3A is a flowchart illustrating a method of estimating and compensating for signal impairments in accordance with some embodiments.

In some embodiments, iterative estimations of the CFO 126 and I/Q mismatch 128 are performed. FIG. 3A illustrates a method 350 of iteratively estimating CFO and I/Q mismatch. The method 350 is performed in a receiver (e.g., receiver unit 250 of transceiver 200, FIG. 2A) in accordance with some embodiments.

In the method 350, a repeating or periodic signal is received (351). In some embodiments, the signal is a repeating training sequence. In some embodiments, the signal is a narrowband signal. In some embodiments, the signal is a cyclic prefix of an OFDM symbol.

CFO (e.g., CFO 126, FIG. 2C) is estimated (352) based on the signal assuming no I/Q mismatch. For example, the CFO is estimated using an autocorrelation technique; the iterative nature of the method 350 accommodates the inaccuracy associated with using autocorrelation. Alternatively, the CFO is estimated using an NLS technique based on the signal. Using the estimated CFO, I/Q mismatch (e.g., receiver-side I/Q mismatch 128, FIG. 2C) is estimated (354). The estimated I/Q mismatch is compensated for (356), and the CFO is then re-estimated (358). The I/Q mismatch is re-estimated (360) using the re-estimated CFO and is compensated for (362), and the re-estimated CFO is compensated for (364).

While the method 350 includes a number of operations that appear to occur in a specific order, it should be apparent that the method 350 can include more or fewer operations. An order of two or more operations may be changed and two or more operations may be combined into a single operation.

In some embodiments, the method 350 is an example of a first phase of a two-phase process of estimating and compensating for signal impairments. In the first phase, estimation of and compensation for receiver-side I/Q mismatch and carrier frequency offset are performed. In a subsequent second phase, estimation of and compensation for transmitter-side I/Q mismatch and channel distortion (e.g., linear channel distortion) are performed. Impairments 126 and 128 (FIG. 1B) thus are estimated and compensated for in the first phase, and impairments 122 and 124 (FIG. 1B) are estimated and compensated for in the second phase. This two-phase approach provides for computational simplicity compared to approaches that jointly estimate and correct for transmitter-side and receiver-side I/Q mismatch, channel distortion, and carrier frequency offset. The two-phase approach thus is easier to implement than joint approaches.

In some embodiments, a two-phased approach is used in communications systems in which the physical layer employs a repetitive known signal (e.g., a training sequence, preamble, or prefix). For example, the two-phased approach may be implemented in systems compatible with one of the IEEE 802.11 family of protocols. In some embodiments, a two-phased approach is used in communications systems that perform multicarrier modulation based on orthogonal frequency-division multiplexing (OFDM). Examples include systems compatible with one of the IEEE 802.11 family of protocols and systems compatible with the 3GPP E-UTRAN (LTE) standard.

Figure 3B:
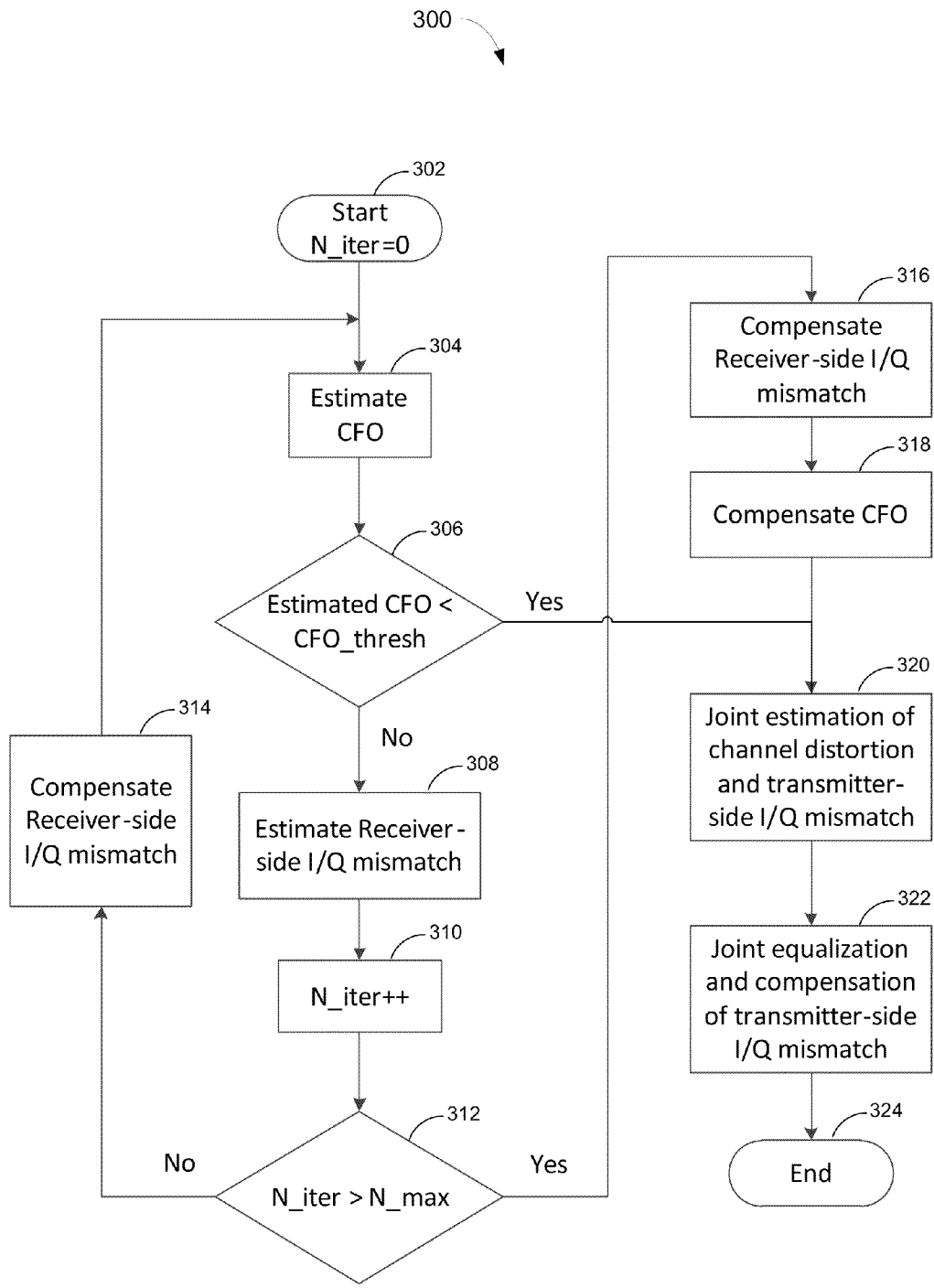
FIG. 3B is a flowchart illustrating a two-phased method of estimating and compensating for signal impairments in accordance with some embodiments.

FIG. 3B is a flowchart illustrating a two-phased method 300 of estimating and compensating for signal impairments in accordance with some embodiments. The method 300 is performed in a receiver (e.g., receiver 106, FIG. 1A). In some embodiments, the method 300 is performed by the receiver baseband processor 280 (FIG. 2A) (e.g., by the signal impairment compensation unit 285, FIG. 2A). In some embodiments, the method 300 uses a training signal or dedicated repeating preamble but in general the method 300 is not so limited. The method 300 thus is performed in the digital domain in baseband in accordance with some embodiments. During phase one, carrier frequency offset (e.g., CFO 126, FIG. 2C) and receiver-side I/Q mismatch (e.g., I/Q mismatch 128, FIG. 2C) are repeatedly estimated for a predefined number of iterations. Phase one is terminated, however, if the estimated carrier frequency offset is determined to be less than a specified threshold, even if the predefined number of iterations has not been completed. In response to a determination that the estimated carrier frequency offset is less than the specified threshold, the method 300 proceeds to phase two, in which channel distortion is estimated and equalized and transmitter-side I/Q mismatch is estimated and compensated for.

At the start 302 of the method 300, an iteration counter (N_iter) is set to zero. An estimate of carrier frequency offset is made (304) using any known technique. For example, non-linear least-squares (NLS) techniques that process multiple symbols at a time (e.g., from a repeating training sequence or the cyclic prefix of an OFDM symbol) may be used to estimate the carrier frequency offset. Alternately, autocorrelation techniques may be used. In some embodiments, the estimation of carrier frequency offset is made assuming no receiver-side I/Q mismatch. For example, the estimation of carrier frequency offset is agnostic toward receiver-side I/Q mismatch.

The estimated carrier frequency offset is compared (306) to a predefined threshold (CFO_thresh). The predefined threshold is system-dependent. In some embodiments implemented in OFDM systems, the predefined threshold is set to be comparable to the sub-carrier spacing.

If the estimated carrier frequency offset is less than the predefined threshold (306—Yes), phase one is terminated and the method 300 proceeds to operations 320 and 322 of phase two (described below).

If the estimated carrier frequency offset is not less than the predefined threshold (306—No), an estimate is made (308) of the receiver-side I/Q mismatch. This estimate is made, for example, as described below with regard to FIGS. 4A-4D and equations (1)-(5).

The iteration counter is incremented (310) and compared (312) to the predefined number of iterations (N_max). In some embodiments, N_max equals two. In some embodiments, N_max has a value in the range of 2-10.

If the incremented iteration counter is not greater than N_max (312—No), compensation is performed (314) for the receiver-side I/Q mismatch estimated at 308, and the method 300 returns to operation 304.

If the incremented iteration counter is greater than N_max (312-Yes), compensation is performed (316) for the receiver-side I/Q mismatch estimated at 308, and compensation is performed (318) for carrier frequency offset estimated at 304. The carrier frequency offset compensation is performed using any known technique (e.g., phase rotation). At this point, phase one is complete. The estimation operations 304 and 308 and compensation operations 314/316 thus are performed a number of times equal to N_max, assuming that the estimated carrier frequency offset is not determined to be less than the predefined threshold during one of the iterations. Note that if N_max=2 and the determination at 306 is "No" in both iterations, phase one is an example of the method 350 (FIG. 3A). If N_max (i.e., the predefined number of iterations) is greater than two, portions of phase one are an example of the method 350 (FIG. 3A): for example, operations 352-356 of the method 350 may correspond to a first iteration and operations 358-362 of the method 350 may correspond to a final iteration.

In phase two of method 300, a joint estimate is made (320) of channel distortion (e.g., distortion 124, FIG. 1B) and transmitter-side I/Q mismatch (e.g., mismatch 122, FIG. 1B). Joint equalization of the estimated channel distortion and compensation for the estimated transmitter-side I/Q mismatch is performed (322), at which point the method 300 ends (324). Equalization of channel distortion and compensation for transmitter-side I/Q mismatch thus are performed after receiver-side I/Q mismatch and carrier frequency offset have been compensated for in accordance with some embodiments. (Equalization of channel distortion compensates for the channel distortion.) In some embodiments, equalization of channel distortion and compensation for transmitter-side I/Q mismatch are performed in the frequency domain, as described below.

While the method 300 includes a number of operations that appear to occur in a specific order, it should be apparent that the method 300 can include more or fewer operations. An order of two or more operations may be changed and two or more operations may be combined into a single operation.

Figure 2D:
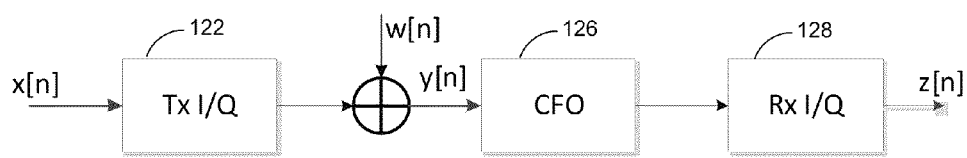
Figure 4A:
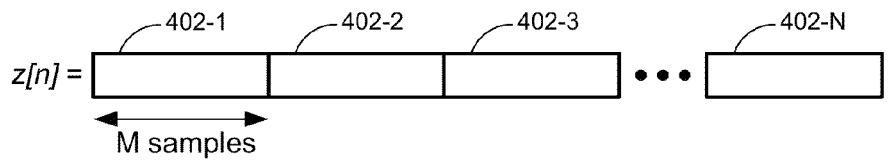
FIGS. 4A-4D illustrate a periodic signal used for receiver-side I/Q mismatch estimation and compensation in accordance with some embodiments.

Attention is now directed to estimating and compensating for receiver-side I/Q mismatch. A repeating or periodic narrowband signal (e.g., a training signal) z[n] is used, as shown in FIG. 2D and FIG. 4A in accordance with some embodiments, and the carrier frequency offset is estimated beforehand (e.g., the CFO is estimated in operation 304, FIG. 3B, prior to estimating the receiver-side I/Q mismatch in operation 308). The variable n indexes samples of the signal. Each period 402 of the signal z[n] includes M samples, as shown in FIG. 4A, where M is an integer greater than or equal to one. For example, a first period 402-1 includes M samples, as does a second period 402-2, a third period 402-3, and an Nth period 402-N.

The signal z[n] may be expressed as:

$$z[n] = (a_{Rx}a_{Tx})e^{j\Delta\omega n}x[n] + (a_{Rx}b_{Tx})e^{j\Delta\omega n}x^*[n] + (b_{Rx}a^*_{Tx})e^{-j\Delta\omega n}x^*[n] + (b_{Rx}b^*_{Tx})e^{-j\Delta\omega n}x[n] + a_{Rx}w[n] + b_{Rx}w^*[n]$$

The received signal over two successive periods of length M is:

$$z[n] = a_{Rx}[e^{j\Delta\omega n}y[n]] + b_{Rx}[e^{-j\Delta\omega n}y^*[n]] + \tilde{w}[n]$$

$$z[n+M] = a_{Rx}e^{j\Delta\omega M}[e^{j\Delta\omega n}y[n]] + b_{Rx}e^{-j\Delta\omega M}[e^{-j\Delta\omega n}y^*[n]] + \tilde{w}[n+M]$$

The signal y[n] includes the (unknown) transmitter I/Q mismatch 122 (FIG. 2D).

Receiver-side I/Q mismatch is compensated by performing a linear transformation involving a scalar correction factor q to generate a compensated received signal $\hat{z}[n]$. Specifically:

$$\hat{z}[n] = [z[n] \; z^*[n]] \begin{bmatrix} 1 \\ q \end{bmatrix} \quad (1)$$

where $z^*[n]$ is the complex conjugate of $z[n]$.

Assuming perfect compensation and thus perfect correction, $$q = \frac{-b_{RX}}{a^*_{Rx}}$$

and the corrected received signal over two successive training sequences reads $$\hat{z}[n] = a_{Rx}\left(1 - \frac{|b_{Rx}|^2}{|a_{Rx}|^2}\right)e^{j\Delta\omega n}y[n] + a_{Rx}\left(1 - \frac{|b_{Rx}|^2}{|a_{Rx}|^2}\right)w[n]$$

$$\hat{z}[n+M] = a_{Rx}e^{j\Delta\omega M}\left(1 - \frac{|b_{Rx}|^2}{|a_{Rx}|^2}\right)e^{j\Delta\omega n}y[n] + a_{Rx}\left(1 - \frac{|b_{Rx}|^2}{|a_{Rx}|^2}\right)w[n+M]$$

Neglecting the noise and assuming perfect compensation for receiver-side I/Q mismatch, it holds that:

$$\hat{z}[n+M] = e^{j\Delta\omega M}\hat{z}[n] \quad (2)$$

where $\Delta\omega$ is the carrier frequency offset (e.g., as estimated in operation 304, FIG. 3B) in units of radians/sample. Relationship (2) thus holds that a compensated sample in a given period (e.g., period 402-2) equals the compensated sample in a previous period (e.g., period 402-1) multiplied by a phase factor determined by the product of the carrier frequency offset and the number of samples in a period.

Figure 4B:
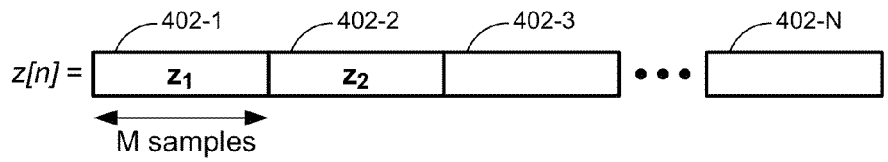

Relationship (2) holds for all samples within two successive periods. FIG. 4B illustrates samples in two successive periods, including a vector $z_1$ of samples in period 402-1 and a vector $z_2$ of samples in period 402-2. Relationship (2) holds between vectors $z_1$ and $z_2$, such that:

$$[z_2 \; z_2^*]\begin{bmatrix} 1 \\ q \end{bmatrix} = e^{j\Delta\omega M}[z_1 \; z_1^*]\begin{bmatrix} 1 \\ q \end{bmatrix} \quad (3)$$

Solving equation (3) for the correction factor q yields:

$$q = \frac{-(z_2^* - e^{j\Delta\omega M}z_1^*)^H(z_2 - e^{j\Delta\omega M}z_1)}{\|z_2^* - e^{j\Delta\omega M}z_1^*\|^2} \quad (4)$$

In equation (4), H refers to the Hermitian transpose operation (i.e., taking the transpose conjugate of the vector by transposing the vector and taking the complex conjugate of each element). The correction factor q is determined using equation (4) and is then used to determine the compensated received signal $\hat{z}[n]$ in accordance with equation (1).

Figure 4C:
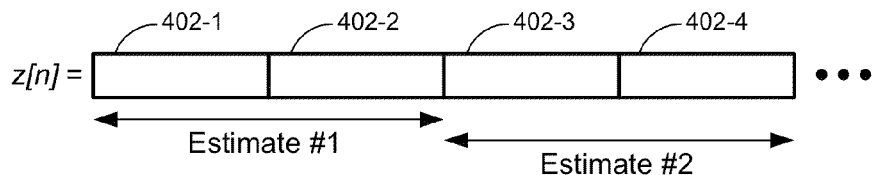

In some embodiments, accuracy of the receiver-side I/Q mismatch estimation is improved by averaging multiple estimates from adjacent periods. For example, a first estimate is made based on periods 402-1 and 402-2 and a second estimate is made based on periods 402-3 and 402-4, as illustrated in FIG. 4C in accordance with some embodiments. Each of the two estimates is made, for example, using equation (4). The first and second estimates are then averaged, and the resulting value of q is used to compensate for the receiver-side I/Q mismatch using equation (1).

Figure 4D:
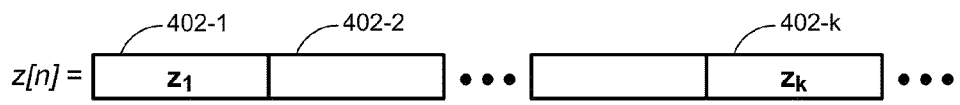

In some embodiments, conditioning of the problem of estimating the receiver-side I/Q mismatch is improved by using non-consecutive periods. Using non-consecutive periods helps to ensure a reasonably large value of the carrier frequency offset ($\Delta\omega$). FIG. 4D illustrates an example in which vectors $z_1$ and $z_k$ for respective non-consecutive periods 402-1 and 402-$k$ are used, where the index k indicates the separation between the two periods (i.e., there are k−1 periods between period 402-1 and period 402-$k$). In this example, equation (3) is modified to:

$$[z_k \; z_k^*] \begin{bmatrix} 1 \\ q \end{bmatrix} = e^{j\Delta\omega kM} [z_1 \; z_1^*] \begin{bmatrix} 1 \\ q \end{bmatrix} \quad (5)$$

Equation (5) is then solved for the correction factor q, and the resulting value of q is used to compensate for the receiver-side I/Q mismatch in accordance with equation (1).

In some embodiments, instead of using a periodic training signal, the cyclic prefix of an OFDM symbol is used to estimate the receiver-side I/Q mismatch. While the cyclic prefix changes from OFDM symbol to OFDM symbol, it repeats twice and thus may be considered a repeating signal.

Equations (1)-(5) describe performing estimation of and compensation for receiver-side I/Q mismatch in the time domain. In some embodiments, after time-domain compensation of receiver-side I/Q mismatch (e.g., in phase one of method 300, FIG. 3B), transmitter-side I/Q mismatch and channel distortion are compensated for in the frequency domain. The frequency-domain compensation may also compensate for residual receiver-side I/Q mismatch that was not compensated for in the time domain. Frequency-domain compensation is performed, for example, in the receiver of an OFDM system.

In the frequency domain, OFDM transmissions may be modeled by a complex transmit symbol vector $x_c$, a complex diagonal channel matrix $H_c$, a complex receive symbol vector $y_c$, and a complex additive noise vector $n_c$:

$$y_c = H_c x_c + n_c.$$

An equivalent real-valued notation is:

$$y = Hx + n$$

where $$x = x_{cR} \otimes \begin{bmatrix} 1 \\ 0 \end{bmatrix} + x_{cI} \otimes \begin{bmatrix} 0 \\ 1 \end{bmatrix}$$

$$n = n_{cR} \otimes \begin{bmatrix} 1 \\ 0 \end{bmatrix} + n_{cI} \otimes \begin{bmatrix} 0 \\ 1 \end{bmatrix}$$

$$y = y_{cR} \otimes \begin{bmatrix} 1 \\ 0 \end{bmatrix} + y_{cI} \otimes \begin{bmatrix} 0 \\ 1 \end{bmatrix}$$

and $$H = H_{cR} \otimes \begin{bmatrix} 1 & 0 \\ 0 & 1 \end{bmatrix} + H_{cI} \otimes \begin{bmatrix} 0 & -1 \\ 1 & 0 \end{bmatrix}.$$

Figure 6:
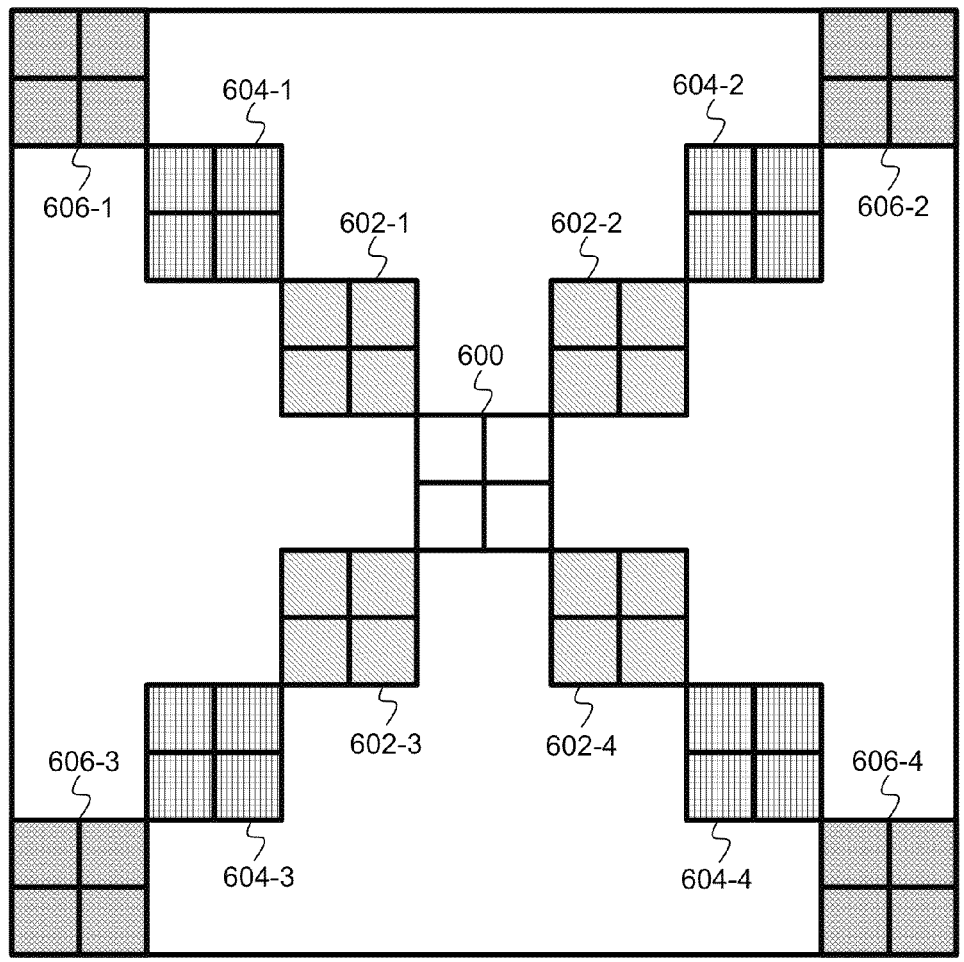
FIG. 6 illustrates a channel matrix used for frequency-domain signal impairment estimation and compensation in accordance with some embodiments.

Here, $\otimes$ denotes the Kronecker product. H becomes a block diagonal matrix with blocks of size 2×2, as illustrated in FIG. 6 in accordance with some embodiments. The real and imaginary parts of each entry are stacked on top of each other in x, y, and n.

Transmitter and receiver IQ mismatch cause interference between a frequency f and its mirror frequency −f. The real-valued model allows us to redefine H such that it includes the modeling of transmitter and receiver IQ mismatch. FIG. 6 illustrates the structure of the effective channel matrix H including transmitter and receiver IQ mismatch. The interference between f and −f adds blocks on the main skew diagonal of H. In the center, the 2×2 matrix 600 corresponds to the zero frequency. There is no interference between symbols that are affected by entries with different fill patterns in the matrix. For example, symbols affected by entries 602-1 through 602-4 do not interfere with symbols affected by entries 600, 604-1 through 604-4, and 606-1 through 606-4, and so on. Therefore, it is sufficient to consider a submatrix composed of the entries marked with a single fill pattern in FIG. 6.

The transmitter and receiver IQ offsets are respectively modeled by $$\begin{bmatrix} \cos(\varphi_T) & A_T\sin(\varphi_T) & -A_T\cos(\varphi_T) & \sin(\varphi_T) \\ -A_T\sin(\varphi_T) & \cos(\varphi_T) & \sin(\varphi_T) & A_T\cos(\varphi_T) \\ -A_T\cos(\varphi_T) & \sin(\varphi_T) & \cos(\varphi_T) & A_T\sin(\varphi_T) \\ \sin(\varphi_T) & A_T\cos(\varphi_T) & -A_T\sin(\varphi_T) & \cos(\varphi_T) \end{bmatrix}$$

and $$\begin{bmatrix} \cos(\varphi_R) & -A_R\sin(\varphi_R) & A_R\cos(\varphi_R) & \sin(\varphi_R) \\ A_R\sin(\varphi_R) & \cos(\varphi_R) & \sin(\varphi_R) & -A_R\cos(\varphi_R) \\ -A_R\cos(\varphi_R) & \sin(\varphi_R) & \cos(\varphi_R) & A_R\sin(\varphi_R) \\ \sin(\varphi_R) & A_R\cos(\varphi_R) & -A_R\sin(\varphi_R) & \cos(\varphi_R) \end{bmatrix}$$

where $A_T/2$ and $A_R/2$ are the transmitter and receiver amplitude offsets and $\phi_T/2$ and $\phi_R/2$ are the transmitter and receiver phase offsets in terms of per cent. Assuming that the frequency response is represented by the complex numbers $h_f$ and $h_{-f}$ we define a symmetric component $$h_s = (h_f + h_{-f})/2 = |h_s|(\cos(\phi_{cs}) + j\sin(\phi_{cs}))$$

and an asymmetric component $$h_a = (h_f - h_{-f})/2 = |h_a|(\cos(\phi_{ca}) + j\sin(\phi_{ca})).$$

Combining the transmitter IQ offset, the channel matrix, and the receiver 10 offset, we obtain $$Z = \begin{bmatrix} Z_1 & -Z_2 & Z_7 & Z_8 \\ Z_2 & Z_1 & Z_8 & -Z_7 \\ Z_3 & Z_4 & Z_5 & -Z_6 \\ Z_4 & -Z_3 & Z_6 & Z_5 \end{bmatrix} =$$

$$\begin{bmatrix} X_1 & -X_2 & X_3 & X_4 \\ X_2 & X_1 & X_4 & -X_3 \\ X_3 & X_4 & X_1 & -X_2 \\ X_4 & -X_3 & X_2 & X_1 \end{bmatrix} + \begin{bmatrix} Y_1 & -Y_2 & -Y_3 & -Y_4 \\ Y_2 & Y_1 & -Y_4 & Y_3 \\ Y_3 & Y_4 & -Y_1 & Y_2 \\ Y_4 & -Y_3 & -Y_2 & -Y_1 \end{bmatrix}$$

with $$X_1 = |h_s|[\cos(\phi_{cs})(1+A_R A_T)\cos(\phi_T-\phi_R) - \sin(\phi_{cs})(A_T+A_R)\sin(\phi_T-\phi_R)],$$

$$Y_1 = |h_a|[\cos(\phi_{ca})(1+A_R A_T)\cos(\phi_T+\phi_R) - \sin(\phi_{ca})(A_T-A_R)\sin(\phi_T+\phi_R)],$$

$X_2=|h_s|[\cos(\phi_{cs})(A_T-A_R)\sin(\phi_T+\phi_R)+\sin(\phi_{cs})(1-A_RA_T)\cos(\phi_T+\phi_R)]$, $Y_2=|h_a|[\cos(\phi_{ca})(A_T+A_R)\sin(\phi_T+\phi_R)+\sin(\phi_{ca})(1+A_RA_T)\cos(\phi_T-\phi_R)]$, $X_3=|h_s|[\cos(\phi_{cs})(A_T+A_R)\cos(\phi_T-\phi_R)-\sin(\phi_{cs})(1+A_RA_T)\sin(\phi_T-\phi_R)]$, $Y_3=|h_a|[\cos(\phi_{ca})(A_T-A_R)\cos(\phi_T+\phi_R)-\sin(\phi_{ca})(1-A_RA_T)\sin(\phi_T+\phi_R)]$, $X_4=|h_s|[\cos(\phi_{cs})(1-A_RA_T)\sin(\phi_T+\phi_R)+\sin(\phi_{cs})(A_T-A_R)\cos(\phi_T+\phi_R)]$, and $Y_4=|h_a|[\cos(\phi_{ca})(1+A_RA_T)\sin(\phi_T-\phi_R)+\sin(\phi_{ca})(A_T+A_R)\cos(\phi_T-\phi_R)]$.

Note that X denotes the contribution due to $h_s$ and Y denotes the contribution due to $h_a$.

An estimate of H may be obtained by estimating the frequency response at certain frequencies and subsequently interpolating between these estimates. The estimated frequency responses are spaced closely enough with respect to the coherence bandwidth. The frequency response is jointly estimated for f and its mirror frequency −f. This is done using pilot symbols that are symmetric with respect to frequency zero. Considering Z we observe that eight parameters are to be estimated jointly. At least two OFDM symbols are used to get a valid estimate. Examples of valid pilot matrices include $$P = \begin{bmatrix} 1 & -1 \\ 0 & 0 \\ 1 & 1 \\ 0 & 0 \end{bmatrix},$$

$$P = \begin{bmatrix} 1 & 0 \\ 0 & 0 \\ 0 & 1 \\ 0 & 0 \end{bmatrix},$$

or more generally $$P = \begin{bmatrix} p_1 & -p_3 \\ p_2 & -p_4 \\ p_3 & p_1 \\ p_4 & p_2 \end{bmatrix} \quad (6)$$

where the first column specifies a symbol transmitted in time slot 1 and the second column specifies a symbol transmitted in time slot 2. Also, every entry in a respective column may be multiplied by −1 without changing the relevant properties. In some embodiments, the interpolation is done independently for the diagonal elements and the skew diagonal elements.

Assuming that P was transmitted, R=ZP is observed at the receiver. Based on P and $$R = \begin{bmatrix} r_1 & r_5 \\ r_2 & r_6 \\ r_3 & r_7 \\ r_4 & r_8 \end{bmatrix}$$

we construct the following matrices $$R_{eff} = \begin{bmatrix} r_1 & -r_2 & r_5 & -r_6 \\ r_2 & r_1 & r_6 & r_5 \\ r_3 & r_4 & r_7 & r_8 \\ r_4 & -r_3 & r_8 & -r_7 \end{bmatrix}$$

and the orthogonal pilot matrix $$P_{eff} = \begin{bmatrix} p_1 & -p_2 & -p_3 & p_4 \\ p_2 & p_1 & -p_4 & -p_3 \\ p_3 & p_4 & p_1 & p_2 \\ p_4 & -p_3 & p_2 & -p_1 \end{bmatrix}.$$

From this we can estimate Z:

$$Z_{est}=R_{eff}P_{eff}^H(P_{eff}*P_{eff}^H)^{-1}. \quad (7)$$

Note that $(P_{eff}*P_{eff}^H)^{-1}$ is a diagonal matrix and thus can be represented as a scaling factor. To apply a zero-forcing approach, $Z_{est}$ is inverted. The inversion of Z has the same complexity as the inversion of a 2×2 complex matrix even though there does not exist a complex-valued equivalent. Hence, no inversions of arbitrary 4×4 matrices are involved in compensating for Z.

This frequency-domain compensation technique inherently includes the estimation and correction of a frequency-dependent IQ offset. In particular, frequency-selective IQ offset compensation is performed at the edge frequencies.

Also, this frequency-domain compensation technique assumes no carrier frequency offset. If there were a carrier frequency offset, H would result in a fully occupied matrix, which reflects the inter-subcarrier interference caused by the carrier frequency offset and makes CFO compensation in the frequency domain computationally inefficient. Accordingly, in some embodiments CFO is corrected in the time domain prior to the conversion of the received signal into the frequency domain.

Figure 7:
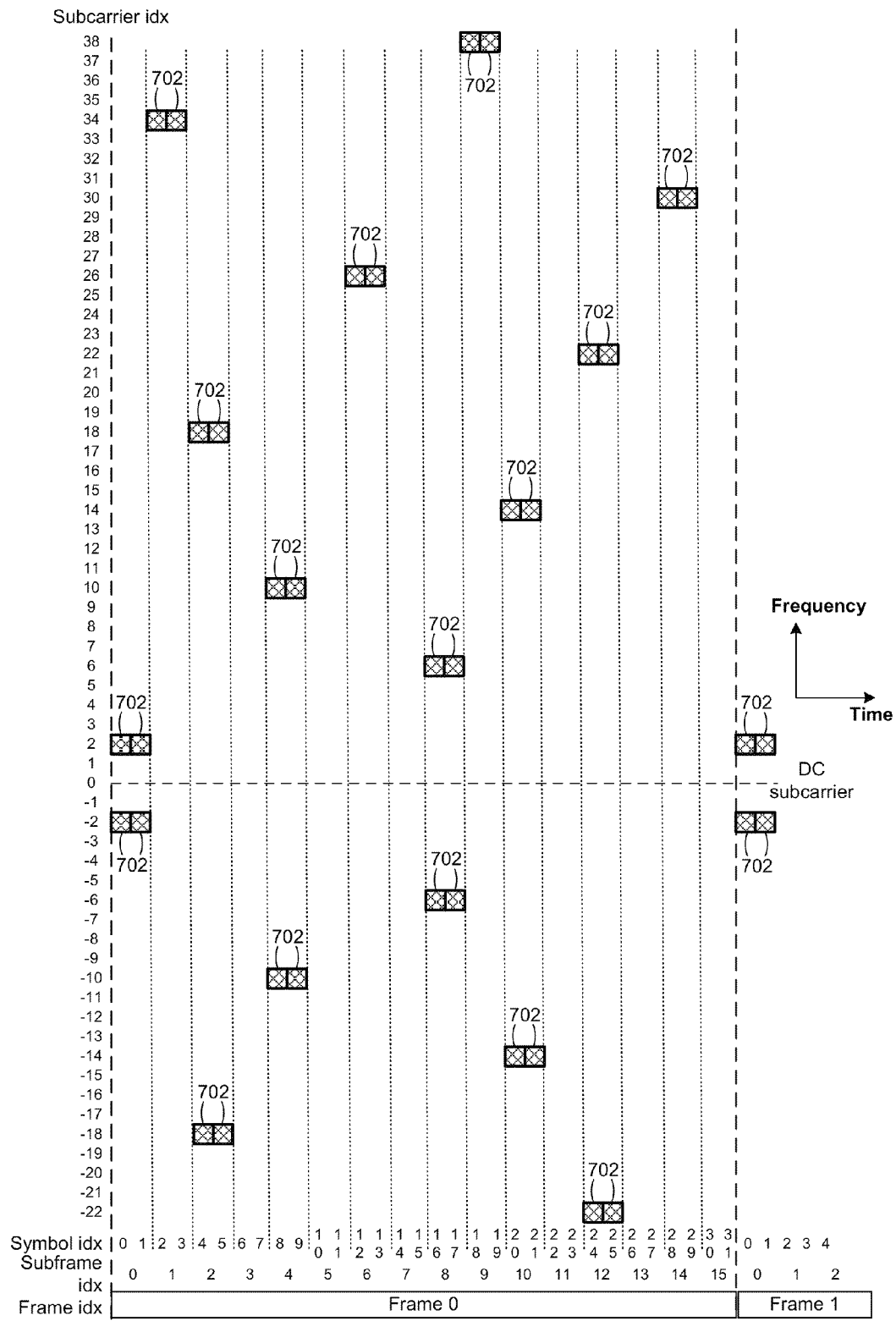
FIG. 7 illustrates successive pairs of OFDM symbols with pilot symbols on different sets of subcarriers in accordance with some embodiments.

FIG. 7 illustrates successive pairs of OFDM symbols transmitted by a transmitter 102 (FIG. 1A) and received by a receiver 106 (FIG. 1A). The OFDM symbols include known pilot symbols 702 on different sets of subcarriers (the placing of the pilot symbols 702 is indicated by the boxes in FIG. 7). These pilot symbols 702 are known modulation symbols placed on respective subcarriers. The OFDM symbols are indexed by a symbol index ("symbol idx") and the subcarriers are indexed by a subcarrier index ("subcarrier idx"). Successive pairs of OFDM symbols compose respective subframes, which are indexed by a subframe index ("subframe idx"). For example, OFDM symbols 0 and 1 compose subframe 0, OFDM symbols 2 and 3 compose subframe 1, and so on. A specified number of subframes (e.g., 16 subframes) compose a frame. Frames are indexed by a frame index ("frame idx"). FIG. 7 shows only a snapshot (i.e., a portion) of the available subcarriers. For example, there may be 4096, 8192, or 16,384 subcarriers.

Pilot symbols 702 are placed on the same subcarriers in both OFDM symbols of a subframe (e.g., in accordance with Equation (6) for pilot matrices) and are symmetric (e.g., mirrored) about a center carrier frequency, which is the DC subcarrier in baseband. The subcarriers used for pilot symbols 702 are evenly spaced on each side of the center carrier frequency. For example, 1 of every 64 subcarriers is used for a pilot symbol 702. For OFDM symbols 0 and 1 (i.e., subframe 0), subcarriers 2, 66, 130, and so on, and also subcarriers -2, -66, -130, and so on, are used for pilot symbols 702. For OFDM symbols 2 and 3 (i.e., subframe 1), subcarriers 34, 98, 162, and so on, and also subcarriers -34, -98, -162, and so, are used for pilot symbols 702. The pilot symbol overhead is thus 1/64 (or more generally, a predefined fraction), resulting in a corresponding reduction in spectral efficiency; the remaining 63 of each 64 subcarriers may be used for data transmission.

Within a given subframe, the pilot symbols 702 are generated in accordance with equation (6) or a variant of equation (6) in which one of the columns of the orthogonal pilot matrix of equation (6) is multiplied by −1 (thus maintaining the orthogonality). In the pilot matrix of equation (6), or variants thereof, the first column corresponds to the first OFDM symbol in the subframe and the second column corresponds to the second OFDM symbol in the subframe. The first two entries in each column correspond to the real and imaginary components of a pilot symbol 702 above the center carrier frequency and the second two entries in each column correspond to the real and imaginary components of a pilot symbol 702 below the center carrier frequency. For example, the first OFDM symbol includes a first pilot symbol 702 on a subcarrier above the center carrier frequency (i.e., a positive subcarrier) and a second pilot symbol 702 on a subcarrier below the center carrier frequency (i.e., a negative subcarrier), and the second OFDM symbol includes the first pilot symbol 702 on the subcarrier below the center carrier frequency and the negative of the second pilot symbol 702 on the subcarrier above the center carrier frequency. Alternatively, the second OFDM symbol includes the second pilot symbol 702 on the subcarrier above the center carrier frequency and the negative of the first pilot symbol 702 on the subcarrier below the center carrier frequency. In these examples, the subcarrier above the center carrier frequency and the subcarrier below the center carrier frequency (i.e., the negative and positive subcarriers) are symmetric about the center carrier frequency.

The pilot symbol subcarriers in the different subframes of a frame are staggered with respect to each other, such that a predefined fraction of subcarriers are used for pilot symbols 702 somewhere in the frame. The subcarriers to be used for pilot symbols 702 in a given subframe may be determined by averaging the indices of the subcarriers used in two previous subframes, resulting in a pattern that is staggered in time as shown in FIG. 7. In the example of FIG. 7, every fourth subcarrier is used for pilot symbols 702 in some subframe within the frame. Each frame in this example thus includes OFDM symbols with 16 different sets of pilot positions.

For each subframe, the receiver 106 (FIG. 1A) estimates frequency responses for the subcarriers of the pilot symbols 702 (e.g., using Equation (7)) and compensates accordingly for the estimated frequency response, which represents signal impairment. Thus, in the example of FIG. 7, frequency response estimation is performed for every fourth subcarrier during reception of each frame. Frequency responses for the remaining subcarriers (i.e., the subcarriers not used for pilot symbols 702 anywhere in the frame) may be interpolated and compensated for accordingly.

Including pilot symbols 702 in each OFDM symbol (e.g., staggered in a pattern such as the pattern of FIG. 7, or alternatively in the same subcarriers from OFDM symbol to OFDM symbol) enables continuous tracking of phase noise and carrier frequency offset, while using only a small amount of overhead (e.g., 1/64). Furthermore, the symmetry of the pilot symbol subcarriers about the center carrier frequency and the use of the same subcarriers for pilot symbols 702 in a pair of OFDM symbols (e.g., in accordance with Equation (6)) enables correction of transmitter and/or receiver IQ mismatch (e.g., in accordance with Equation (7)).

The spacing of subcarriers used for pilot symbols 702 within a frame may be determined based on the minimal coherence bandwidth, which corresponds to a maximal delay spread equal to the cyclic prefix length. For example, for a cyclic prefix length of 4 us, and thus a maximal delay spread of 4 us, the minimal coherence bandwidth is 250 kHz. The spacing of pilot symbol subcarriers may be a specified fraction of the coherence bandwidth. For example, if the spacing between subcarriers in FIG. 7 is 12.5 kHz, the spacing between subcarriers used for pilot symbols 702 somewhere within a frame is 50 kHz, or one-fifth of the coherence bandwidth, since every fourth subcarrier is used for pilot symbols 702 at some point within a frame.

In some embodiments, correction of the carrier frequency offset involves correction of the (estimated) receiver IQ offset (e.g., as illustrated in methods 350 and 300, FIGS. 3A and 3B). For example, method 350 or 300 (FIGS. 3A and 3B) is used to correct the carrier frequency offset and receiver IQ mismatch if a carrier frequency offset is present. Frequency-domain estimation and correction are then used to compensate for the influence of the channel, transmitter IQ offset, and any residual receiver IQ offset. If no carrier frequency offset is present, a joint estimate of the channel, transmitter IQ offset, and receiver IQ offset is obtained.

Attention is now directed to joint estimation of and correction for both transmitter-side and receiver-side I/Q mismatch. In some embodiments, carrier frequency offset is estimated, after which joint estimation of transmitter-side and receiver-side I/Q mismatch is performed.

Let us define $p_1=a_{Rx}a_{Tx}$, $p_2=a_{Rx}b_{Tx}$, $p_3=b_{Rx}a^*_{Tx}$, $p_4 \leq b_{Rx}b^*_{Tx}$. These four unknown parameters can be estimated in a similar fashion as in the case of receiver-only IQ mismatch. The received signal vector $z[n]$ can be written as $$z[n] = [\tilde{x}_1[n] \quad \tilde{x}_2[n] \quad \tilde{x}_3[n] \quad \tilde{x}_4[n]] \begin{bmatrix} p_1 \\ p_2 \\ p_3 \\ p_4 \end{bmatrix} + \tilde{w}[n]$$

where $\tilde{x}_1[n]=e^{j\Delta\omega n}x[n]$, $\tilde{x}_2[n]=e^{j\Delta\omega n}x^*[n]$, $\tilde{x}_3[n]=e^{-j\Delta\omega n}x^*[n]$, $\tilde{x}_4[n]=e^{-j\Delta\omega n}x[n]$. Inversion of the N×4 system matrix to solve for the four unknown parameters can be avoided by employing adaptive filtering techniques such as LMS.

Once the signal parameters have been estimated, both CFO and transmitter-side and receiver-side I/Q imbalance can be compensated. The received signal can be re-written as $$z[n]=(p_1 e^{j\Delta\omega n}+p_4 e^{-j\Delta\omega n})s[n]+(p_2 e^{j\Delta\omega n}+p_3 e^{-j\Delta\omega n})x^*[n]+a_{Ex}w[n]+b_{Rx}w^*[n]$$

Transmitter-side and receiver-side I/Q mismatch can be compensated jointly via the following transformation:

$$\hat{z}[n] = \frac{1}{|u[n]|^2 - |s[n]|^2}[u^*[n]z[n] - s[n]z^*[n]]$$

where $u[n]=p_1 e^{j\Delta\omega n}+p_4 e^{-j\Delta\omega n}$ and $s[n]=p_2 e^{j\Delta\omega n}+p_3 e^{-j\Delta\omega n}$. The signal after joint CFO and I/Q compensation reads $\tilde{z}[n]=x[n]+\tilde{w}[n]$ For small I/Q mismatch, such that we can approximate $f[n]\approx 1$, $\sin\Delta\phi\approx\Delta\phi$, $\cos\Delta\phi\cancel{1}$, $g[n]\sin\Delta\phi\approx 0$, the signal model simplifies to $z[n]=e^{j\Delta\omega n}x[n]+b_{Tx}e^{j\Delta\omega n}x^*[n]+b_{Rx}e^{-j\Delta\omega n}x^*[n]+w[n]+b_{Rx}w^*[n]$ This simplification allows the transmitter-side and receiver-side I/Q mismatch to be estimated separately. In some embodiments, the correction procedure would first compensate for receiver-side I/Q mismatch, then compensate for the CFO (e.g., via phase rotation), and then compensate for the transmitter-side I/Q mismatch. For example, the method 300 (FIG. 3B) would be used for the correction procedure.

In some embodiments the method 350 (FIG. 3A) is used for joint compensation, wherein operations 354 and 360 estimate the joint receiver-side and transmitter-side I/Q mismatch and operations 356 and 362 compensate for the joint I/Q mismatch.

Figure 2E:
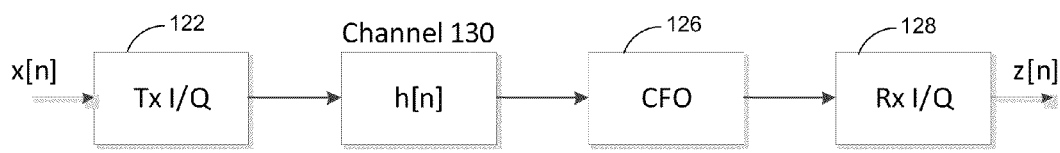

Attention is now directed to wideband signals. In some embodiments, if signals occupy a wide bandwidth, multipath channel effects are considered, as is the frequency dependency of I/Q mismatch at both the transmitter and receiver side. FIG. 2E illustrates signal impairments for wideband signals, including a channel transfer function h[n] for a channel 130.

The overall received signal at the receiver can be expressed as the sum of four signal components and an effective noise component $z[n]=a_{Rx}[n]*[e^{j\Delta\omega n}(h[n]*a_{Tx}[n]*x[n])]+a_{Rx}[n]*$
$[e^{j\Delta\omega n}(h[n]*b_{Tx}[n]*x[n])]+b_{Rx}[n]*[e^{-j\Delta\omega n}(h[n]*a^*_{Tx}[n]*x^*[n])]+b_{Rx}[n]*[e^{-j\Delta\omega n}(h[n]*b^*_{Tx}[n]*x[n])]+a_{Rx}[n]*w[n]+b_{Rx}[n]*w^*[n]$ The signal components other than the first constitute the interference due to I/Q mismatch at transmitter and receiver side. The last interference term is presumably quite weak as compared to the preceding two.

Before compensating for I/Q mismatch, the CFO is estimated by employing a narrowband signal (e.g., a narrowband training signal). In some embodiments, the I/Q mismatch is then estimated separately for the receiver side and the transceiver side, by analogy for the narrowband case, using convolution matrices to account for the frequency dependency of the I/Q mismatch.

Alternatively, joint estimation and correction of transmitter-side and receiver-side I/Q mismatch is performed. If the CFO is small compared to the coherence bandwidth of the channel and transmitter/receiver I/Q filters, the frequency shift due to CFO can be corrected before filtering operations. Therefore, the received signal in the frequency domain can be expressed as $$Z(f) = P_1(f)X\left(f+\frac{\Delta\omega}{2\pi}\right) + P_2(f)X^*\left(-f+\frac{\Delta\omega}{2\pi}\right) + P_3(f)X^*\left(-f-\frac{\Delta\omega}{2\pi}\right) + P_4(f)X\left(f-\frac{\Delta\omega}{2\pi}\right) + \tilde{W}(f)$$

Estimation and compensation is performed by analogy to the narrowband case.

Figure 5:
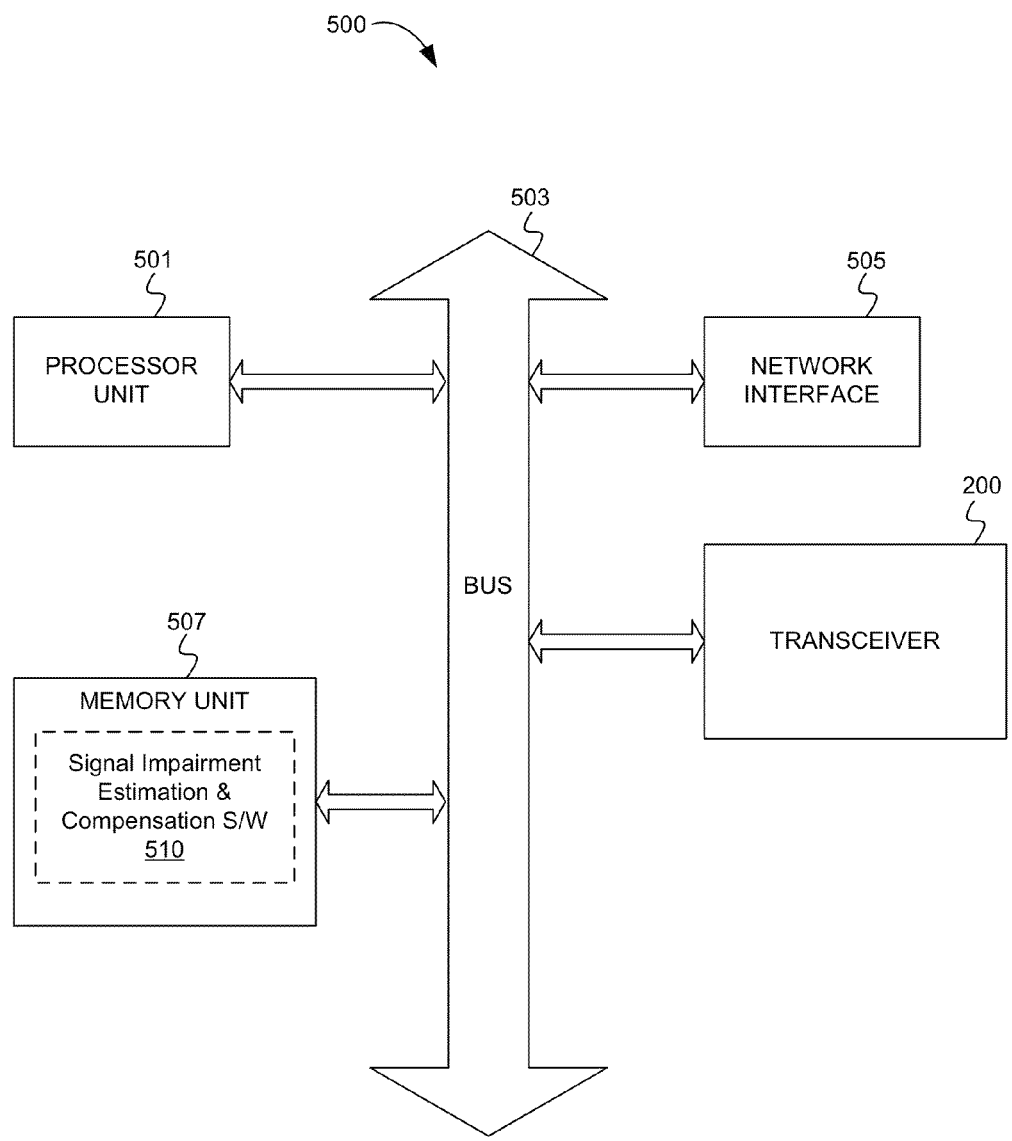
FIG. 5 is a block diagram of a communication device in accordance with some embodiments.

FIG. 5 is an example of a block diagram of a communication device 500 that performs signal impairment estimation and compensation. In some embodiments, the device 500 is a wireless device (e.g., a WLAN device, such as a personal computer, laptop or tablet computer, mobile phone, personal digital assistant, GPS device, wireless access point, or other electronic device). In some embodiments, the device 500 has a wired network connection.

The device 500 includes a processor unit 501, memory unit 507, network interface 505, and transceiver 200 (FIG. 2A) coupled by a bus 503. The processor unit 501 includes one or more processors and/or processor cores. In some embodiments, the network interface 505 includes at least one wireless network interface (e.g., a WLAN interface, a Bluetooth® interface, a WiMAX interface, a ZigBee® interface, a Wireless USB interface, etc.). In some embodiments, the device 500 includes at least one wired network interface (e.g., to interface with a coaxial cable or other physical medium).

The memory unit 507 includes a non-transitory computer-readable storage medium (e.g., one or more nonvolatile memory elements, such as EPROM, EEPROM, Flash memory, a hard disk drive, and so on) that stores a signal impairment estimation and compensation software module 510. In some embodiments, the software module 510 includes one or more programs with instructions that, when executed by processor unit 501 and/or by the receiver baseband processor 280 (FIG. 2A), cause the mobile device 500 to perform the methods 300 and/or 350 (FIGS. 3A-3B). In some embodiments, these instructions include instructions for performing time-domain compensation (e.g., as described with regard to FIGS. 4A-4D and equations 1-5) and/or frequency domain compensation. In some embodiments, these instructions include instructions for separately estimating and compensating for transmitter and receiver IQ mismatch and/or for jointly estimating and compensating for transmitter and receiver IQ mismatch, using any technique described herein.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method, comprising:
   in a transceiver:
   receiving a repeating or periodic signal;
   iteratively estimating a carrier frequency offset for the transceiver based on the signal, estimating an I/Q mismatch for the receiver based on the signal and the estimated carrier frequency offset, and compensating for the estimated I/Q mismatch, while the estimated carrier frequency offset is not less than a threshold and for a number of iterations that does not exceed a specified count;
   after iteratively estimating the carrier frequency offset, estimating the I/Q mismatch, and compensating for the estimated I/Q mismatch, compensating for the estimated carrier frequency offset as estimated in a final iteration; and
   after compensating for the estimated carrier frequency offset as estimated in the final iteration, estimating channel distortion and transmitter-side I/Q mismatch, and compensating for the estimated channel distortion and transmitter-side I/Q mismatch.

2. The method of claim 1, wherein estimating the transmitter-side I/Q mismatch comprises:
using received pilot symbols that are symmetric with respect to a zero frequency to make frequency response estimates at specified frequencies.

3. The method of claim 2, wherein estimating the transmitter-side I/Q mismatch further comprises interpolating between the frequency response estimates at the specified frequencies.

4. The method of claim 2, wherein the specified frequencies comprise mirror frequencies.

5. The method of claim 1, wherein compensating for the transmitter-side I/Q mismatch comprises performing frequency-selective compensation.

6. The method of claim 1, wherein compensating for the estimated carrier frequency offset as estimated in the final iteration comprises performing phase rotation.

7. The method of claim 1, further comprising determining, in the transceiver, that the estimated carrier frequency offset as estimated in a respective iteration is not less than the threshold, wherein estimating the I/Q mismatch for the transceiver and compensating for the estimated I/Q mismatch are performed in the respective iteration in response to the determining.

8. The method of claim 7, further comprising, in the transceiver:
in the final iteration, determining that the estimated carrier frequency offset is less than the threshold; and
in response to determining that the estimated carrier frequency offset is less than the threshold:
terminating the final iteration;
estimating channel distortion and transmitter-side I/Q mismatch; and
compensating for the estimated channel distortion and transmitter-side I/Q mismatch.

9. The method of claim 1, wherein estimating the carrier frequency offset comprises calculating the carrier frequency offset based on autocorrelation of the signal.

10. The method of claim 1, wherein estimating the carrier frequency offset comprises assuming an absence of I/Q mismatch.

11. The method of claim 1, wherein:
the signal is a narrowband signal; and
estimating the I/Q mismatch for the transceiver comprises calculating a scalar correction factor.

12. The method of claim 1, wherein the signal comprises a cyclic prefix of an orthogonal frequency-division multiplexing (OFDM) symbol.

13. The method of claim 1, wherein the signal is a periodic signal and the I/Q mismatch for the transceiver is estimated using non-consecutive periods of the periodic signal.

14. The method of claim 1, wherein the signal is a periodic signal and estimating the I/Q mismatch for the transceiver comprises:
making a first estimate of the I/Q mismatch for the transceiver based on a first pair of periods of the periodic signal;
making a second estimate of the I/Q mismatch for the transceiver based on a second pair of periods of the periodic signal; and
averaging the first and second estimates.

15. A communication device, comprising:
a receiver to receive signals including a repeating or periodic signal;
one or more processors; and
memory storing one or more programs to be executed by the one or more processors, the one or more programs comprising instructions for:
iteratively estimating a carrier frequency offset for the receiver based on the signal, estimating an I/Q mismatch for the receiver based on the signal and the estimated carrier frequency offset, and compensating for the estimated I/Q mismatch for the receiver, while the estimated carrier frequency offset is not less than a threshold and for a number of iterations that does not exceed a specified count;
after iteratively estimating the carrier frequency offset, estimating the I/Q mismatch, and compensating for the estimated I/Q mismatch, compensating for the estimated carrier frequency offset as estimated in a final iteration; and
after compensating for the carrier frequency offset as estimated in the final iteration, estimating and compensating for channel distortion and transmitter-side I/Q mismatch.

16. The communication device of claim 15, wherein the instructions to estimate and compensate for channel distortion and transmitter-side I/Q mismatch comprise instructions to use received pilot symbols that are symmetric with respect to a zero frequency to make frequency response estimates at specified frequencies.

17. The communication device of claim 15, wherein the one or more programs further comprise:
instructions to determine, in each iteration, whether the estimated carrier frequency offset is less than the threshold, before estimating the I/Q mismatch for the receiver; and
instructions to halt execution of an iteration if the estimated carrier frequency offset is less than the threshold.

18. The communication device of claim 17, wherein the one or more programs further comprise instructions to estimate and compensate for channel distortion and transmitter-side I/Q mismatch after halting execution of an iteration.

19. The communication device of claim 15, wherein the one or more processors comprise a baseband processor in the receiver.

20. A communication device, comprising:
a receiver to receive signals including a repeating or periodic signal;
means for iteratively estimating a carrier frequency offset for the receiver based on the signal, estimating an I/Q mismatch for the receiver based on the signal and the estimated carrier frequency offset, and compensating for the estimated I/Q mismatch for the receiver, while the estimated carrier frequency offset is not less than a threshold and for a number of iterations that does not exceed a specified count;
means for compensating for the estimated carrier frequency offset as estimated in a final iteration, after iteratively estimating the carrier frequency offset, estimating the I/Q mismatch, and compensating for the estimated I/Q mismatch; and
means for estimating channel distortion and transmitter-side I/Q mismatch after compensating for the carrier frequency offset as estimated in the final iteration.

* * * * *